United States Patent
Tsugawa et al.

(10) Patent No.: US 11,834,073 B2
(45) Date of Patent: Dec. 5, 2023

(54) AUTONOMOUS DRIVING SYSTEM

(71) Applicant: TOYOTA JIDOSHA KABUSHIKI KAISHA, Toyota (JP)

(72) Inventors: Yutaro Tsugawa, Tokyo-to (JP); Kenichiroh Hara, Yokohama (JP); Kazuhiro Tomosue, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 302 days.

(21) Appl. No.: 17/448,448

(22) Filed: Sep. 22, 2021

(65) Prior Publication Data
US 2022/0089188 A1 Mar. 24, 2022

(30) Foreign Application Priority Data
Sep. 24, 2020 (JP) .................................. 2020-159621

(51) Int. Cl.
*B60W 60/00* (2020.01)
*B60W 30/18* (2012.01)
(Continued)

(52) U.S. Cl.
CPC .. *B60W 60/0016* (2020.02); *B60W 30/18163* (2013.01); *G06V 20/584* (2022.01); *G06V 20/597* (2022.01); *G06V 40/166* (2022.01); *B60W 2420/42* (2013.01); *B60W 2540/225* (2020.02); *B60W 2552/10* (2020.02); *B60W 2554/4041* (2020.02); *B60W 2556/60* (2020.02)

(58) Field of Classification Search
CPC ....... B60W 2540/225; B60W 60/0016; B60W 30/18163; B60W 2420/42; G06V 20/584; G06V 20/597; G06V 40/166
See application file for complete search history.

(56) References Cited

U.S. PATENT DOCUMENTS

| | | | |
|---|---|---|---|
| 11,046,247 B1 * | 6/2021 | Park ....................... | B60K 35/00 |
| 2009/0040054 A1 * | 2/2009 | Wang .................... | G06V 20/597 |
| | | | 340/576 |

(Continued)

FOREIGN PATENT DOCUMENTS

| | | | |
|---|---|---|---|
| JP | 2012-247871 A | 12/2012 | |
| JP | 2017-100562 A | 6/2017 | |

(Continued)

*Primary Examiner* — Kenneth J Malkowski
(74) *Attorney, Agent, or Firm* — Sughrue Mion, PLLC

(57) ABSTRACT

The autonomous driving system includes an internal vehicle camera, a vehicle detection device, and a processor configured to detect an angle of a facial direction or a line of sight of the driver, judge whether the driver has checked safety of the surroundings of the vehicle based on the angle, and control autonomous driving of the vehicle. The processor is configured to start a lane change of the vehicle when it is judged that the driver has checked the safety of the surroundings of the vehicle. The processor is configured to judge that the driver has checked the safety when a first condition has been satisfied if another vehicle has not been detected in a destination lane, and judge that the driver has checked the safety when a second condition more severe than the first condition has been satisfied if another vehicle has been detected in the destination lane.

5 Claims, 5 Drawing Sheets

(51) Int. Cl.
*G06V 20/58* (2022.01)
*G06V 20/59* (2022.01)
*G06V 40/16* (2022.01)

(56) References Cited

U.S. PATENT DOCUMENTS

2009/0243880 A1* 10/2009 Kiuchi .................. G08G 1/166
   342/107
2020/0247420 A1* 8/2020 Gunaratne ........... G05D 1/0055
2022/0095975 A1* 3/2022 Aluf ................. B60W 60/0051

FOREIGN PATENT DOCUMENTS

JP     2017-102519 A    6/2017
JP     2017-151694 A    8/2017

* cited by examiner

AUTONOMOUS DRIVING SYSTEM

FIELD

The present disclosure relates to an autonomous driving system.

BACKGROUND

In recent years, an autonomous driving vehicle able to change lanes by autonomous driving has been developed. In such an autonomous driving vehicle, a sensor able to detect other vehicles in the surroundings has been used to confirm the state of the destination lane.

In relation to this, PTL 1 describes that when a sensor does not detect another vehicle, the sensor might be malfunctioning, and therefore the safety of a lane change falls. For this reason, in the driving control device described in PTL 1, even if no other vehicle is detected in the destination lane, the lane change is performed only when confirmation of safety by the driver is detected and the driver presses a start button for the lane change. On the other hand, if another vehicle is detected in the destination lane, the lane change is performed without having to detect confirmation of safety by the driver.

CITATIONS LIST

Patent Literature

[PTL 1] Japanese Unexamined Patent Publication No. 2017-100562

SUMMARY

Technical Problem

However, even if another vehicle were detected by a sensor, the safety of lane change could still be liable to fall due to unforeseen behavior of the other vehicle etc.

In view of the above problem, an object of the present disclosure is to improve safety when performing a lane change by autonomous driving.

Solution to Problem

The summary of the present disclosure is as follows.

(1) An autonomous driving system comprising: an internal vehicle camera capturing a face of a driver of a vehicle and generating a facial image of the driver; a vehicle detection device detecting other vehicles in surroundings of the vehicle; and a processor configured to detect an angle of a facial direction or a line of sight of the driver based on the facial image, judge whether the driver has checked safety of the surroundings of the vehicle based on the angle, and control autonomous driving of the vehicle, wherein the processor is configured to start a lane change of the vehicle when it is judged that the driver has checked the safety of the surroundings of the vehicle and the driver has approved the lane change, and the processor is configured to judge that the driver has checked the safety of the surroundings of the vehicle when a first condition has been satisfied if the vehicle detection device has not detected another vehicle in a destination lane, and judge that the driver has checked the safety of the surroundings of the vehicle when a second condition more severe than the first condition has been satisfied if the vehicle detection device has detected another vehicle in the destination lane.

(2) The autonomous driving system described in above (1), wherein the another vehicle is another vehicle running at a side rear of the vehicle.

(3) The autonomous driving system described in above (1) or (2), wherein the first condition is that the driver performs one action, and the second condition is that the driver performs several actions.

(4) The autonomous driving system described in above (1) or (2), wherein when a lane in which the vehicle is traveling is a through lane, the first condition and the second condition include that the driver looks at a direction of a merging lane which merges into the through lane.

(5) The autonomous driving system described in any one of above (1) to (4), wherein the first condition is that the driver performs a predetermined action, and the second condition is that the driver performs the predetermined action and an additional action.

Advantageous Effects of Invention

According to the present disclosure, it is possible to improve safety when performing a lane change by autonomous driving.

DESCRIPTION OF EMBODIMENTS

Figure 1:
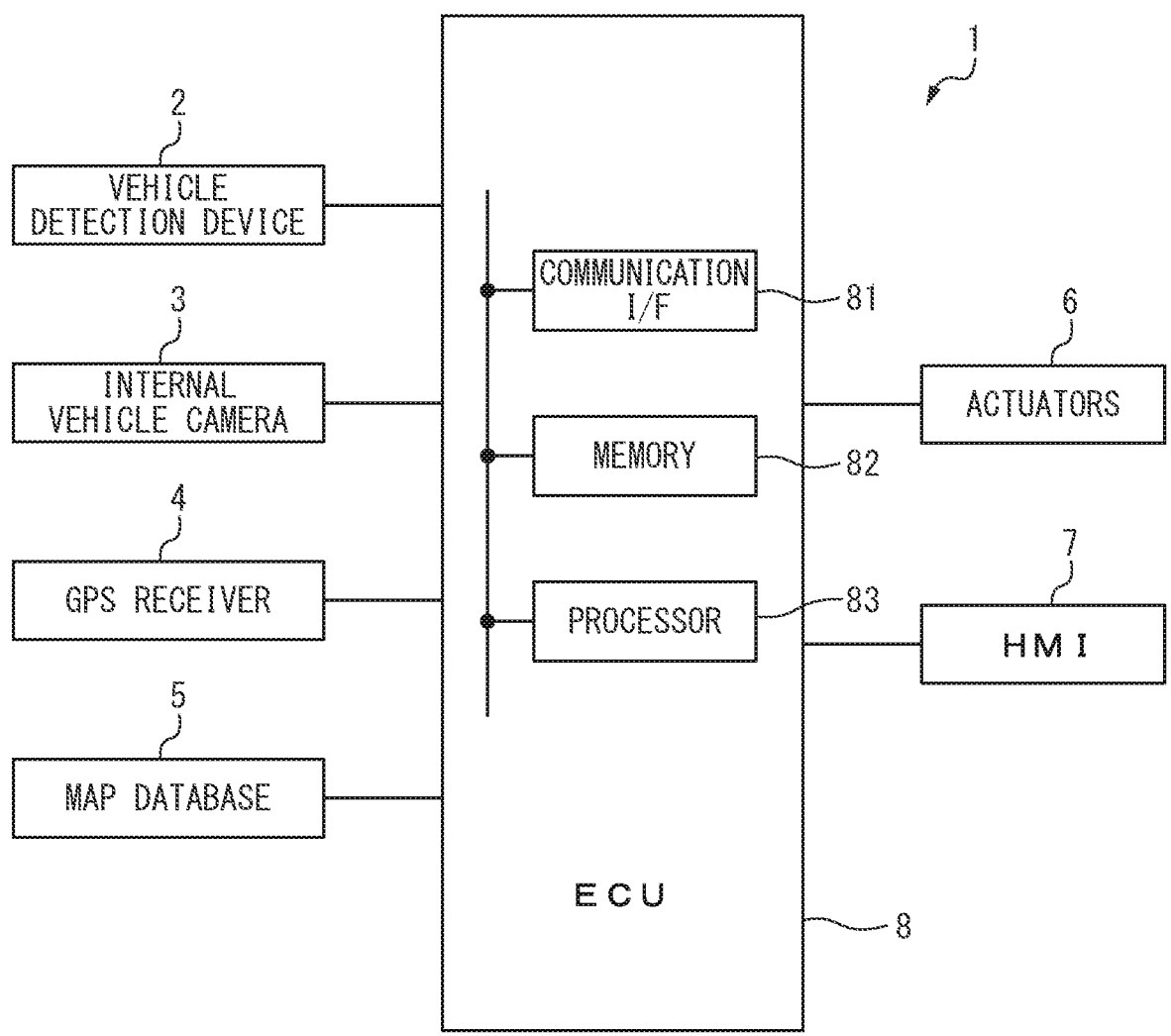
FIG. 1 is a view schematically showing the configuration of an autonomous driving system according to an embodiment of the present disclosure.

Below, referring to the drawings, an embodiment of the present disclosure will be explained in detail. Note that, in the following explanation, similar component elements are assigned the same reference notations.

<Configuration of Autonomous Driving System>

FIG. 1 is a view schematically showing the configuration of an autonomous driving system 1 according to an embodiment of the present disclosure. The autonomous driving system 1 is mounted in a vehicle and enables autonomous driving of the vehicle. In autonomous driving of the vehicle, all or a part of the acceleration, steering, and braking of the vehicle are automatically performed.

As shown in FIG. 1, the autonomous driving system 1 is provided with a vehicle detection device 2, an internal vehicle camera 3, a GPS receiver 4, a map database 5, actuators 6, a HMI 7, and an electronic control unit (ECU) 8. The vehicle detection device 2, the internal vehicle camera 3, the GPS receiver 4, the map database 5, the actuators 6, and the HMI 7 are provided at the vehicle and are connected to the ECU 8 to be able to communicate with it through an internal vehicle network compliant with the CAN (Controller Area Network) or other standard.

The vehicle detection device 2 detects other vehicles in the surroundings of a vehicle (host vehicle). In the present embodiment, the vehicle detection device 2 is comprised of an external vehicle camera, a LIDAR (laser imaging detection and ranging) device, a milliwave radar or ultrasonic sensor (sonar), or any combination of the same. The external vehicle camera captures the surroundings of the vehicle to generate an image in a predetermined range. The LIDAR device fires laser beams to the surroundings of the vehicle and receives reflected beams of those laser beams. The milliwave radar emits milliwaves to the surroundings of the vehicle and receives reflected waves of the milliwaves. The ultrasonic sensor emits ultrasonic waves to the surroundings of the vehicle and receives reflected waves of the ultrasonic waves. The output of the vehicle detection device 2 is transmitted to the ECU 8.

Figure 2:
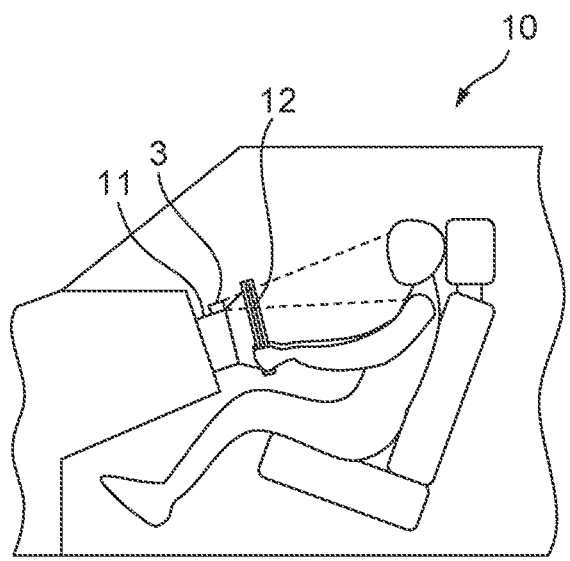
FIG. 2 is a view schematically showing an interior of a vehicle mounting an autonomous driving system.

FIG. 2 is a view schematically showing an inside of a vehicle 10 mounting the autonomous driving system 1. The internal vehicle camera 3 captures a face of the driver of the vehicle 10 and generates a facial image of the driver. The internal vehicle camera 3 is a so-called "driver monitor camera".

The internal vehicle camera 3 is provided at the inside of the vehicle 10. Specifically, as shown in FIG. 2, the internal vehicle camera 3 is provided at the top part of a steering column 11 of the vehicle 10. In FIG. 2, the range of projection of the internal vehicle camera 3 is shown by the broken lines. Note that, the internal vehicle camera 3 may be provided at the steering wheel 12, a room mirror, an instrument panel, an instrument panel hood, etc., of the vehicle 10. Further, the autonomous driving system 1 may be provided with a plurality of internal vehicle camera 3.

The internal vehicle camera 3 includes a camera and a projector. The camera is configured by a lens and an image capturing element and is for example a CMOS (complementary metal oxide semiconductor) camera or a CCD (charge coupled device) camera. The projector is comprised of LEDs (light emitting diodes). For example, it is comprised of two near infrared LEDs placed at the both sides of the camera. By irradiating the driver with near infrared light, it is possible to capture the face of the driver without irritating the driver even at night time or otherwise when the luminance is low. Further, a band pass filter removing light of wavelength components other than near infrared light is provided inside the camera, while a visible light cut filter removing light of the red wavelength component emitted from the near infrared LEDs is provided in front of the projector. The output of the internal vehicle camera 3 is transmitted to the ECU8.

The GPS receiver 4 receives signals from three or more GPS satellites and detects a current position of the vehicle 10 (for example, latitude and longitude of the vehicle 10). The output of the GPS receiver 4 is transmitted to the ECU 8.

The map database 5 stores map information. The map information stored in the map database 5 is updated using communication with the outside of the vehicle 10, SLAM (Simultaneous Localization and Mapping) technology, etc. The ECU 8 acquires map information from the map database 5. The map information is, for example, used when creating a driving plan up to a destination input by the driver.

The actuators 6 make the vehicle 10 operate. For example, the actuators 6 includes a drive device for acceleration of the vehicle 10 (at least one of an engine and a motor), a brake actuator for braking the vehicle 10, a steering motor for steering the vehicle 10, etc. The ECU 8 controls the actuators 6.

The HMI 7 is an input/output device for input and output of information between the driver and the vehicle 10. The HMI 7, for example, includes a display for displaying information, a speaker for generating sound, operating buttons or a touch screen for manual input by the driver, a microphone for receiving voice instructions of the driver, etc. Output of the ECU 8 is transmitted through the HMI 7 to the driver, while input from the driver is transmitted through the HMI 7 to the ECU 8.

The ECU 8 performs various control operations of the vehicle 10. As shown in FIG. 1, the ECU 8 is provided with a communication interface 81, a memory 82, and a processor 83. The communication interface 81 and the memory 82 are connected to the processor 83 through a single wire. Note that, in the present embodiment, a single ECU 8 is provided, but a plurality of ECUs may be provided for the individual functions.

The communication interface 81 has an interface circuit for connecting the ECU 8 to an internal vehicle network. That is, the communication interface 81 is connected through the internal vehicle network to the vehicle detection device 2, the internal vehicle camera 3, the GPS receiver 4, the map database 5, the actuators 6, and the HMI 7.

The memory 82, for example, has a volatile semiconductor memory and a nonvolatile semiconductor memory. The memory 82 stores programs, data, etc., used when the processor 83 performs various processing.

The processor 83 has one or more CPUs (central processing units) and their peripheral circuits. Note that, the processor 83 may further have a processing circuit such as a logic unit or arithmetic unit.

Figure 3:
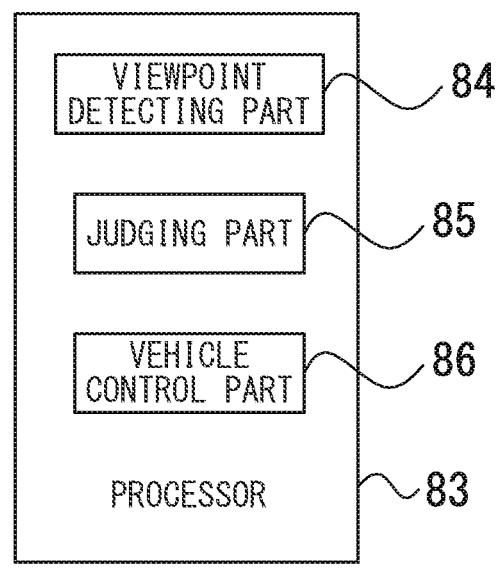
FIG. 3 is a functional block diagram of a processor of an ECU.

FIG. 3 is a functional block diagram of the processor 83 of the ECU 8. In the present embodiment, the processor 83 has a viewpoint detecting part 84, a judging part 85. and a vehicle control part 86. The viewpoint detecting part 84, the judging part 85, and the vehicle control part 86 are respectively functional modules realized by programs stored in the memory 82 being run by the processor 83. Note that, the viewpoint detecting part 84, the judging part 85, and the vehicle control part 86 may respectively be dedicated processing circuits provided at the processor 83.

The viewpoint detecting part 84 detects an angle of a facial direction or a line of sight of the driver based on a facial image generated by the internal vehicle camera 3. The judging part 85 judges whether the driver has checked the safety of the surroundings of the vehicle 10 based on the angle of the facial direction or the line of sight of the driver.

The viewpoint detecting part 84, for example, matches the facial image of the driver generated by the internal vehicle camera 3 with facial shape data when the driver is facing forward so as to detect the angle of the facial orientation of the driver. Specifically, the viewpoint detecting part 84 makes the facial image of the driver rotate so that the rate of match of the two becomes maximum and detects the rotational angle when the rate of match becomes maximum as the angle of the facial orientation of the driver. The facial shape data is stored in advance in the memory 82 of the ECU 8 or another storage device. The facial shape data may be data of a general person or may be acquired for each driver.

Note that, the viewpoint detecting part 84 may match the facial image of the driver generated by the internal vehicle camera 3 with a plurality of facial shape data of the driver differing in facial orientation so as to detect the angle of the facial orientation of the driver. In this case, the viewpoint detecting part 84 detects the facial orientation of the facial shape data giving the greatest rate of match of the two as the angle of the facial orientation of the driver. The plurality of facial shape data is stored in advance in the memory 82 of the ECU 8 or another storage device. The plurality of facial shape data may be data of the faces of general persons or may be acquired for each driver.

Further, the viewpoint detecting part 84, for example, detects the angle of the line of sight of the driver by the following method. First, the viewpoint detecting part 84 identifies the facial region from the facial image of the driver generated by the internal vehicle camera 3 and extracts the features of the eyes, nose, mouth, and other facial parts so as to detect the facial parts. Next, the viewpoint detecting part 84 detects the position of the Purkinje image (corneal reflex image) and the position of the center of the pupil and detects the angle of the line of sight of the driver based on the positional relationship of the Purkinje image and the center of the pupil. Note that, the viewpoint detecting part 84 may detect the angle of the line of sight of the driver based on the positional relationship of the Purkinje image and the center of the pupil and the detected angle of the facial orientation of the driver.

Further, the viewpoint detecting part 84 may detect the angle of the facial orientation or the line of sight of the driver by other known techniques.

The vehicle control part 86 controls the autonomous driving of the vehicle 10. For example, the vehicle control part 86 uses the actuators 6 to control the steering and acceleration of the vehicle 10 to make the vehicle 10 perform a lane change. At this time, the vehicle control part 86 performs the lane change of the vehicle 10 so as to avoid collision with other vehicles detected by the vehicle detection device 2.

However, in order to increase the safety of a lane change, it is desirable to not rely solely on the vehicle detection device 2 but to have the driver himself check the safety. Further, in order to avoid a lane change against the will of the driver, it is desirable to obtain the approval of the driver in advance.

For this reason, the vehicle control part 86 starts the lane change of the vehicle 10 when it is judged that the driver has checked the safety of the surroundings of the vehicle 10 and the driver has approved the lane change. On the other hand, the vehicle control part 86 suspends the lane change of the vehicle 10 when it is judged that the driver has not checked the safety of the surroundings of the vehicle 10 or the driver has not approved the lane change.

Further, the degree of danger at the time of a lane change differs according to the state of the destination lane. If there is another vehicle in the destination lane, a more serious check of safety is required, compared with if there is no other vehicle in the destination lane.

For this reason, the judging part 85 judges that the driver has checked the safety of the surroundings of the vehicle 10 when a first condition has been satisfied if the vehicle detection device 2 has not detected another vehicle in the destination lane, and judges that the driver has checked the safety of the surroundings of the vehicle 10 when a second condition more severe than the first condition has been satisfied if the vehicle detection device 2 has detected another vehicle in the destination lane. By doing this, a check of safety is judged based on a suitable criteria corresponding to the degree of danger, therefore it is possible to improve the safety when performing a lane change by autonomous driving.

The first condition and the second condition are determined in advance. For example, the first condition is that the driver performs one action, while the second condition is that the driver performs several actions. In this case, a specific example of the first condition is that the driver turns his face or turn his line of sight from the front to the direction of lane change (first action), the driver looks in the direction of lane change for a predetermined time (second action), or the driver looks at the room mirror of the vehicle 10 for a predetermined time (third action). On the other hand, a specific example of the second condition is that the driver looks in the direction of the lane change for a predetermined time, then looks to the front (fourth action), the driver turns his face or turn his line of sight two times or more from the front to the direction of lane change (fifth action), the drivers take the first action and the third action, or the driver takes the second action and the third action. The angles of the facial direction or the line of sight corresponding to the front, the direction of the lane change (right or left), and the direction of the room mirror are determined in advance.

Note that, the first condition is that the driver performs a predetermined action, while the second condition is that the driver performs the predetermined action and an additional action. In this case, for example, the first condition is that the driver performs the first action, while the second condition is that the driver performs a fifth action. Further, the first condition may be that the driver performs the second action, while the second condition may be that the driver performs a fourth action. Moreover, the first condition may be that the driver performs third action, while the second condition may be that the driver performs the first action and the third action or the driver performs the second action and the third action.

Figure 4:
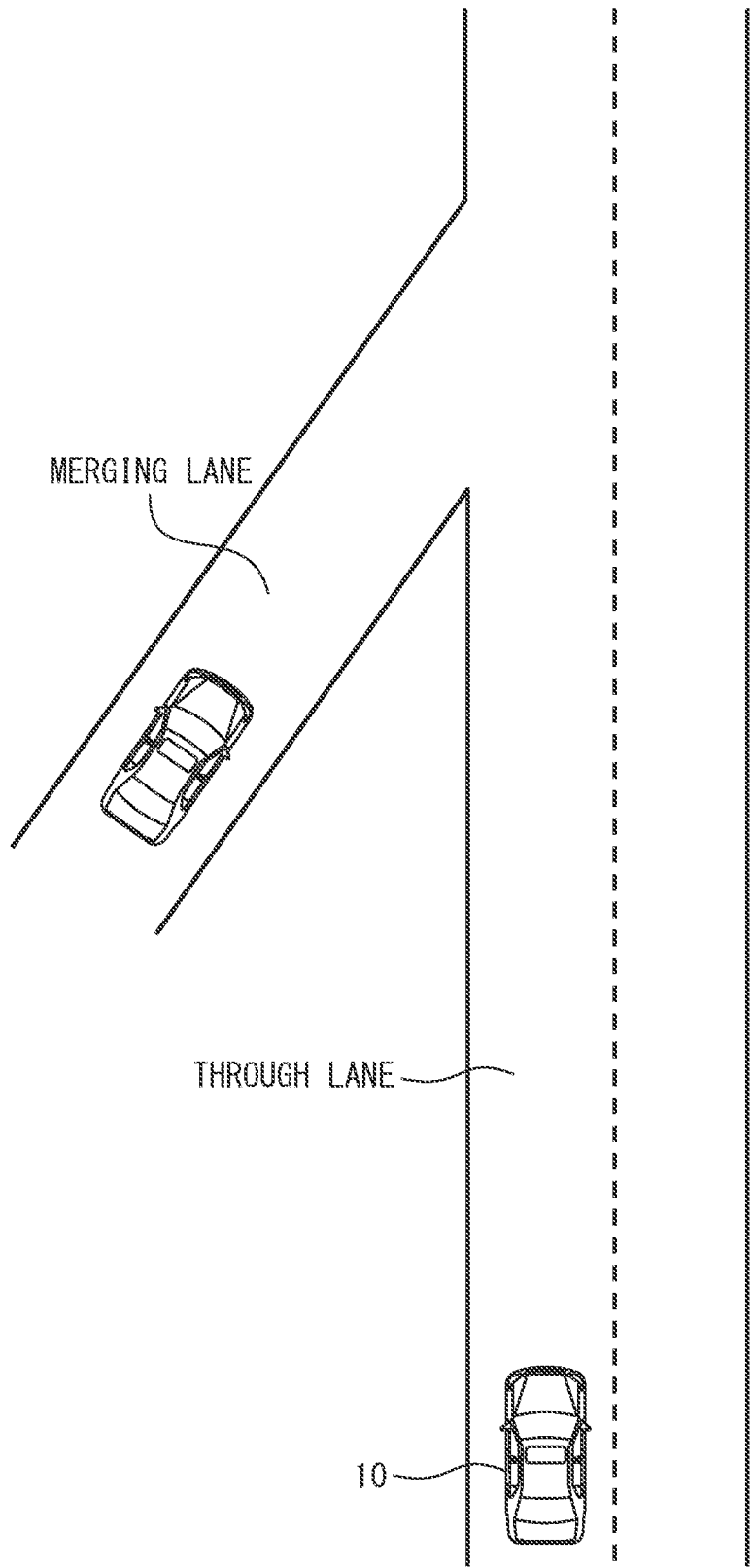
FIG. 4 is a view showing a vehicle driving in a through lane.

Further, as shown in FIG. 4, if the lane in which the vehicle 10 is traveling is a through lane, the first condition and the second condition may include, in addition to the above-mentioned conditions, the driver looking in the direction of the merging lane which merges into the through lane. Due to this, in the state such as shown in FIG. 4, it is possible to much further improve the safety when performing a lane change.

<Processing for Setting Request Flag>

Figure 5:
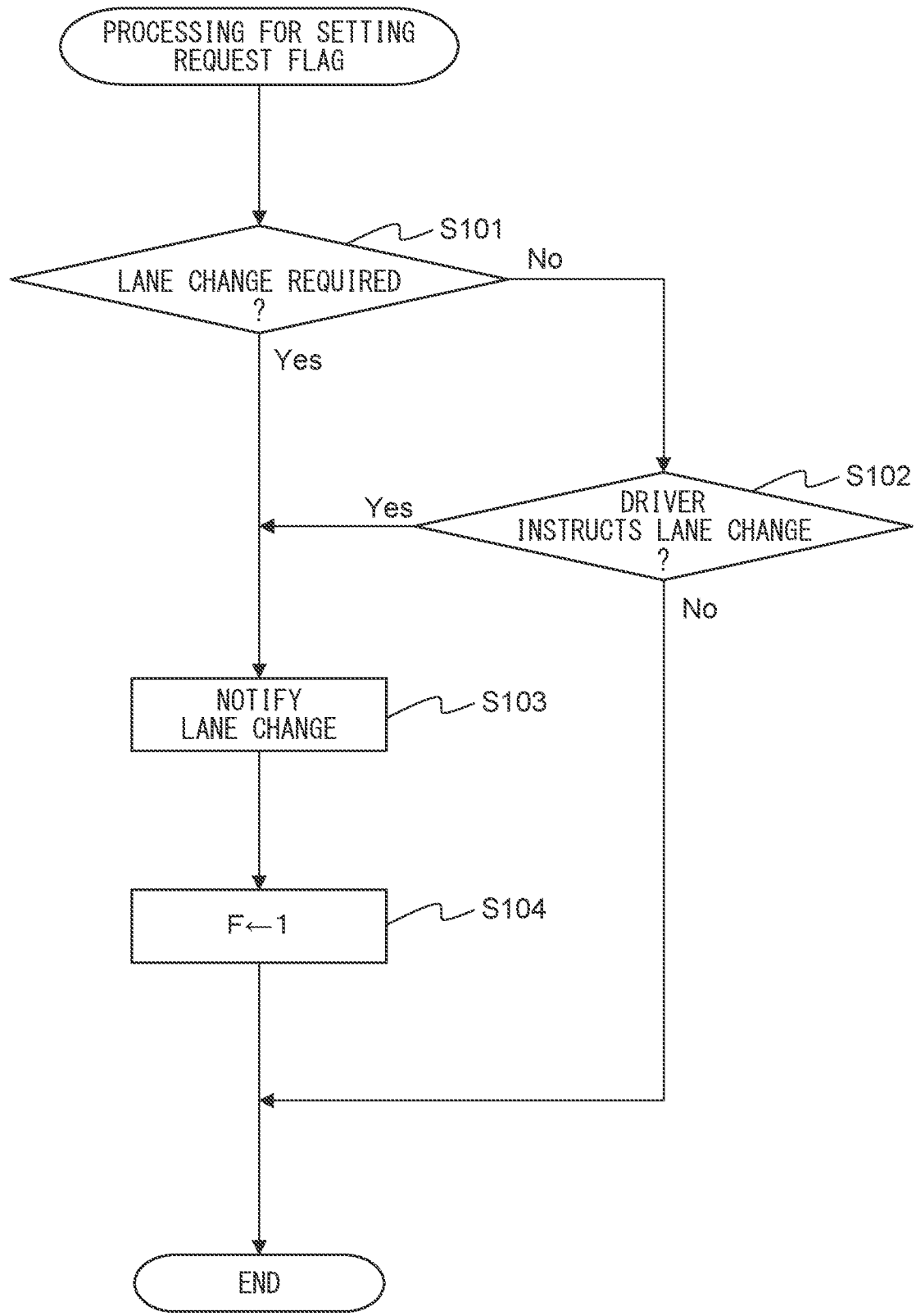
FIG. 5 is a flow chart showing a control routine of processing for setting a request flag.

Below, referring to the flow charts of FIG. 5 and FIG. 6, control for making a lane change by autonomous driving will be explained in detail. FIG. 5 is a flow chart showing a control routine of processing for setting a request flag. The present control routine is repeatedly executed by the ECU 8 at predetermined time intervals. In the present control routine, the request flag F is set in response to a request for lane change.

First, at step S101, the vehicle control part 86 judges whether a lane change of the vehicle 10 is necessary. A "lane change" includes a lane change for passing a vehicle, a lane change for merging, a lane change for turning off, a lane change for avoiding collision for example when being merged with in a highway), etc.

The vehicle control part 86, for example, judges that a lane change is necessary for passing when a relative speed of a preceding vehicle with respect to the vehicle 10 is equal to or less than a predetermined value. The relative speed of a preceding vehicle can be detected by the vehicle detection device 2. Further, the vehicle control part 86, for example, judges that a lane change is necessary for merging or turning off when a distance to or time until reaching a merging point or turnoff point is equal to or less than a predetermined value. The distance to or time until reaching the merging point or turnoff point is calculated based on output of the GPS receiver 4, the map information stored in the map database 5, etc. Further, the vehicle control part 86, for example, judges that a lane change is necessary for avoiding collision when collision with another vehicle merging into the lane in which the vehicle 10 is traveling is predicted based on the outputs of the vehicle detection device 2 and the GPS receiver 4, the map information stored in the map database 5, etc.

If it is judged at step S101 that a lane change of the vehicle 10 is unnecessary, the present control routine proceeds to step S102. At step S102, the vehicle control part 86 judges whether the driver has instructed a lane change. For example, the driver instructs a lane change by entering an instruction into the HMI 7 manually or by voice, operation of a turn signal lever, etc. It is judged based on the detection signals of these whether the driver has instructed a lane change. If it is judged at step S102 that the driver has not instructed a lane change, the present control routine ends.

On the other hand, if it is judged at step S101 that a lane change of the vehicle 10 is necessary or if it is judged at step S102 that the driver has instructed a lane change, the present control routine proceeds to step S103. At step S103, the vehicle control part 86 notifies the driver of the execution of a lane change through the HMI 7. At that time, the HMI 7 may use a display (text etc.) or audio to prompt the driver to check for safety.

Next, at step S104, the vehicle control part 86 sets the request flag F to "1". Note that, the initial value of the request flag F when the ignition switch of the vehicle 10 is turned on is zero. After step S104, the present control routine ends.

<Processing for Changing Lane>

Figure 6:
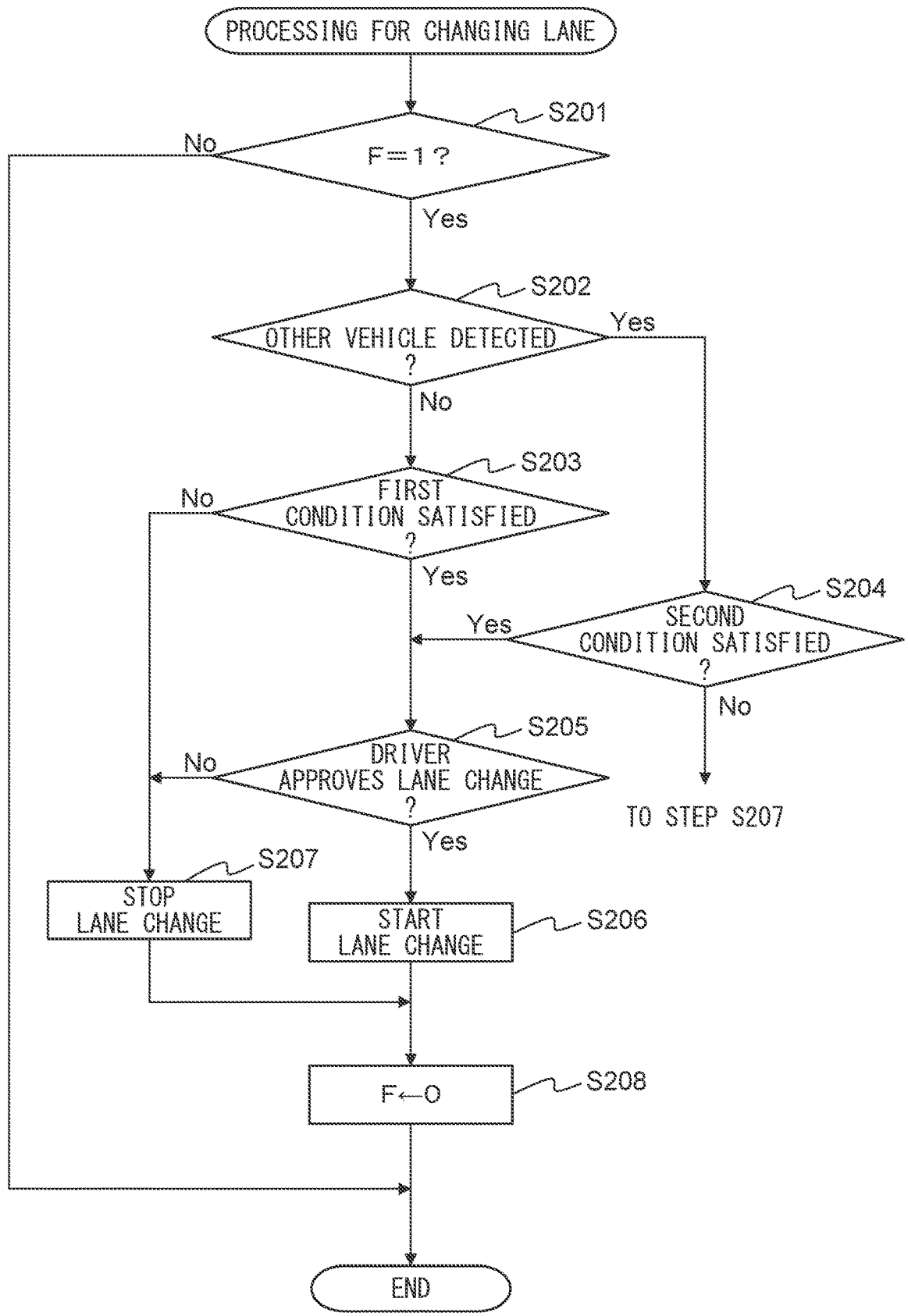
FIG. 6 is a flow chart showing a control routine of processing for changing a lane.

FIG. 6 is a flow chart showing a control routine of processing for changing a lane. The present control routine is repeatedly executed by the ECU 8.

First, at step S201, the judging part 85 judges whether the request flag F is "1". If it is judged that the request flag F is zero, the present control routine ends. On the other hand, if it is judged that the request flag F is "1", the present control routine proceeds to step S202.

At step S202, the judging part 85 judges whether the vehicle detection device 2 has detected another vehicle in the destination lane. If it is judged that another vehicle has not been detected, the present control routine proceeds to step S203. At step S203, the judging part 85 judges whether the first condition has been satisfied within the predetermined time.

On the other hand, if it is judged at step S202 that another vehicle has been detected, the present control routine proceeds to step S204. At step S204, the judging part 85 judges whether the second condition has been satisfied within a predetermined time.

If it is judged at step S203 that the first condition has been satisfied or if it is judged at step S204 that the second condition has been satisfied, the present control routine proceeds to step S205. At step S205, the vehicle control part 86 judges whether the driver has approved the lane change within a predetermined time. For example, the driver approves the lane change by entry into the HMI 7 manually or by voice, touching the steering wheel 12, operating the steering wheel 12, staring at a predetermined position, etc. It is judged whether the driver has approved the lane change based on the detection signals of these.

If it is judged at step S205 that the driver approved the lane change, the present control routine proceeds to step S206. At step S206, the vehicle control part 86 starts the lane change.

On the other hand, if it is judged at step S203 that the first condition has not been satisfied, if it is judged at step S204 that the second condition has not been satisfied, or if it is judged at step S205 that the driver has not approved the lane change, the present control routine proceeds to step S207. At step S207, the vehicle control part 86 suspends the lane change.

After step S206 or step S207, the present control routine proceeds to step S208. At step S208, the vehicle control part 86 resets the request flag F to zero. After step S208, the present control routine ends.

Further, at the time of a lane change, another vehicle present at the side rear of the vehicle 10 in the destination lane is liable to approach the vehicle 10. That is, the degree of danger of another vehicle present at the side rear of the vehicle 10 is high. For this reason, at step S202, the judging part 85 may judge whether the vehicle detection device 2 has detected another vehicle running at the side rear of the vehicle 10 in the destination lane. In this case, a strict condition is imposed for checking safety only in situations where the degree of danger is particularly high, therefore it is possible to secure safety of the vehicle 10 while smoothly performing a lane change by autonomous driving.

Above, a preferred embodiment according to the present disclosure was explained, but the present disclosure is not limited to this embodiment. Various corrections and changes can be made within the language of the claims. For example, the ECU 8 may have a GPU (Graphics Processing Unit).

REFERENCE SIGNS LIST

1 autonomous driving system
2 vehicle detection device
3 internal vehicle camera
8 electronic control unit (ECU)
10 vehicle
83 processor
84 viewpoint detecting part
85 judging part
86 vehicle control part

The invention claimed is:

1. An autonomous driving system comprising:
    an internal vehicle camera capturing a face of a driver of a vehicle and generating a facial image of the driver;
    a vehicle detection device detecting other vehicles in surroundings of the vehicle; and
    a processor configured to detect an angle of a facial direction or a line of sight of the driver based on the facial image, judge whether the driver has checked safety of the surroundings of the vehicle based on the angle, and control autonomous driving of the vehicle, wherein
    the processor is configured to start a lane change of the vehicle when it is judged that the driver has checked the safety of the surroundings of the vehicle and the driver has approved the lane change, and
    the processor is configured to judge that the driver has checked the safety of the surroundings of the vehicle when a first condition has been satisfied if the vehicle detection device has not detected another vehicle in a destination lane, and judge that the driver has checked the safety of the surroundings of the vehicle when a second condition more severe than the first condition has been satisfied if the vehicle detection device has detected another vehicle in the destination lane.

2. The autonomous driving system according to claim 1, wherein the another vehicle is another vehicle running at a side rear of the vehicle.

3. The autonomous driving system according to claim 1, wherein the first condition is that the driver performs one action, and the second condition is that the driver performs several actions.

4. The autonomous driving system according to claim 1, wherein when a lane in which the vehicle is traveling is a through lane, the first condition and the second condition include that the driver looks at a direction of a merging lane which merges into the through lane.

5. The autonomous driving system according claim 1, wherein the first condition is that the driver performs a predetermined action, and the second condition is that the driver performs the predetermined action and an additional action.

\* \* \* \* \*